United States Patent
Takahashi

(10) Patent No.: US 9,876,928 B2
(45) Date of Patent: Jan. 23, 2018

(54) IMAGE PROCESSING DEVICE, IMAGE PROCESSING METHOD, AND NON-TRANSITORY COMPUTER-READABLE MEDIUM

(71) Applicant: FUJI XEROX CO., LTD., Tokyo (JP)

(72) Inventor: Hirokazu Takahashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/204,528

(22) Filed: Jul. 7, 2016

(65) Prior Publication Data
US 2017/0230531 A1    Aug. 10, 2017

(30) Foreign Application Priority Data
Feb. 9, 2016    (JP) .................................. 2016-022457

(51) Int. Cl.
*H04N 1/40* (2006.01)
*H04N 1/23* (2006.01)

(52) U.S. Cl.
CPC ......... *H04N 1/2369* (2013.01); *H04N 1/2338* (2013.01); *H04N 2201/0094* (2013.01)

(58) Field of Classification Search
CPC . H04N 1/2369; H04N 1/2338; H04N 2201/94
USPC ....................................................... 358/1.15
See application file for complete search history.

(56) References Cited

U.S. PATENT DOCUMENTS

| | | | | |
|---|---|---|---|---|
| 5,933,548 A | * | 8/1999 | Morisawa | G06F 17/30265 382/305 |
| 6,674,923 B1 | * | 1/2004 | Shih | G06F 17/30265 235/462.01 |
| 2005/0140991 A1 | * | 6/2005 | Ogiwara | H04N 1/3875 358/1.2 |
| 2007/0146799 A1 | * | 6/2007 | Writt | H04N 1/00352 358/302 |
| 2009/0315904 A1 | * | 12/2009 | Sugimoto | H04N 1/00408 345/531 |
| 2010/0226559 A1 | * | 9/2010 | Najari | G06K 9/186 382/140 |
| 2011/0102853 A1 | * | 5/2011 | Makishima | H04N 1/00864 358/3.28 |
| 2013/0026223 A1 | * | 1/2013 | Murray | H04N 1/2166 235/375 |
| 2014/0198350 A1 | * | 7/2014 | Prabhu | H04N 1/2166 358/403 |
| 2016/0127588 A1 | * | 5/2016 | Hayakawa | H04N 1/00572 358/498 |

(Continued)

FOREIGN PATENT DOCUMENTS

JP    2009-100102 A    5/2009

*Primary Examiner* — Jerome Grant, II
(74) *Attorney, Agent, or Firm* — Oliff PLC

(57) ABSTRACT

An image processing device includes an association unit, a generation unit, an output unit, a reception unit, and a print unit. The association unit associates a first document image with a second image, the second image being an image of a reverse side of the first document image. The generation unit generates multiple images in accordance with a result of the association. The output unit outputs the multiple images generated by the generation unit. The reception unit receives a selection of an image output by the output unit, the selection being made by a user operation. The print unit prints the selected image.

10 Claims, 11 Drawing Sheets

FIG. 9

(56) References Cited

U.S. PATENT DOCUMENTS

2016/0277642 A1* 9/2016 Kuwada ............... H04N 1/6033
2016/0286081 A1* 9/2016 Kimura .............. H04N 1/40018

* cited by examiner

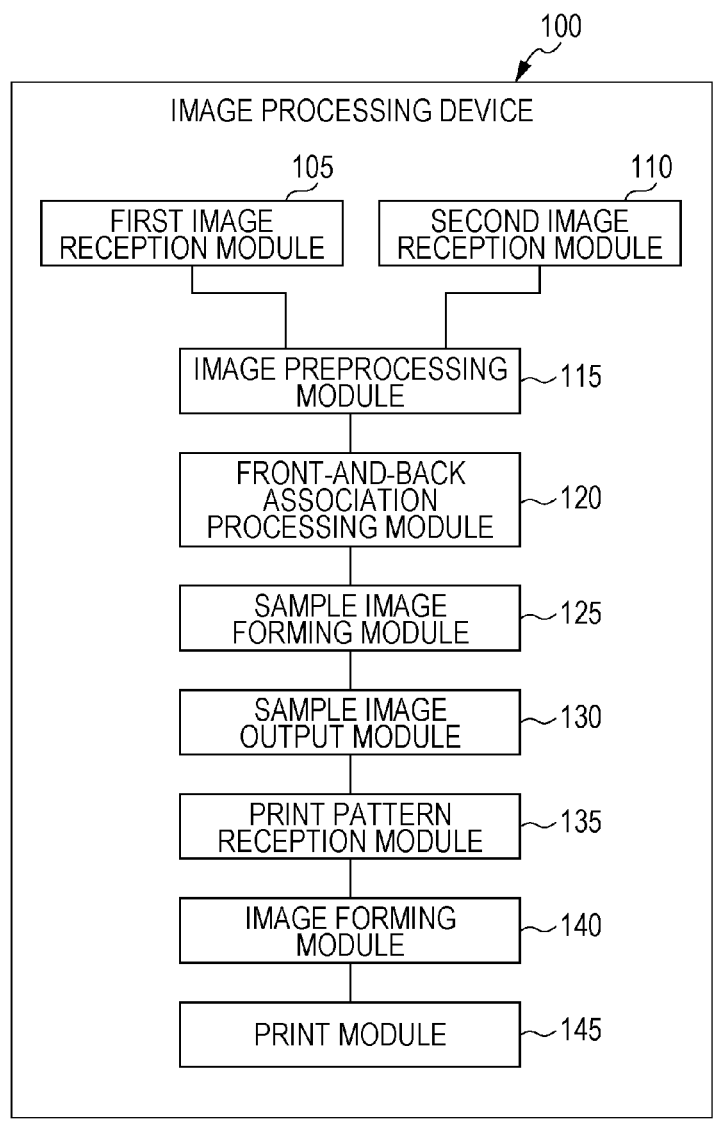

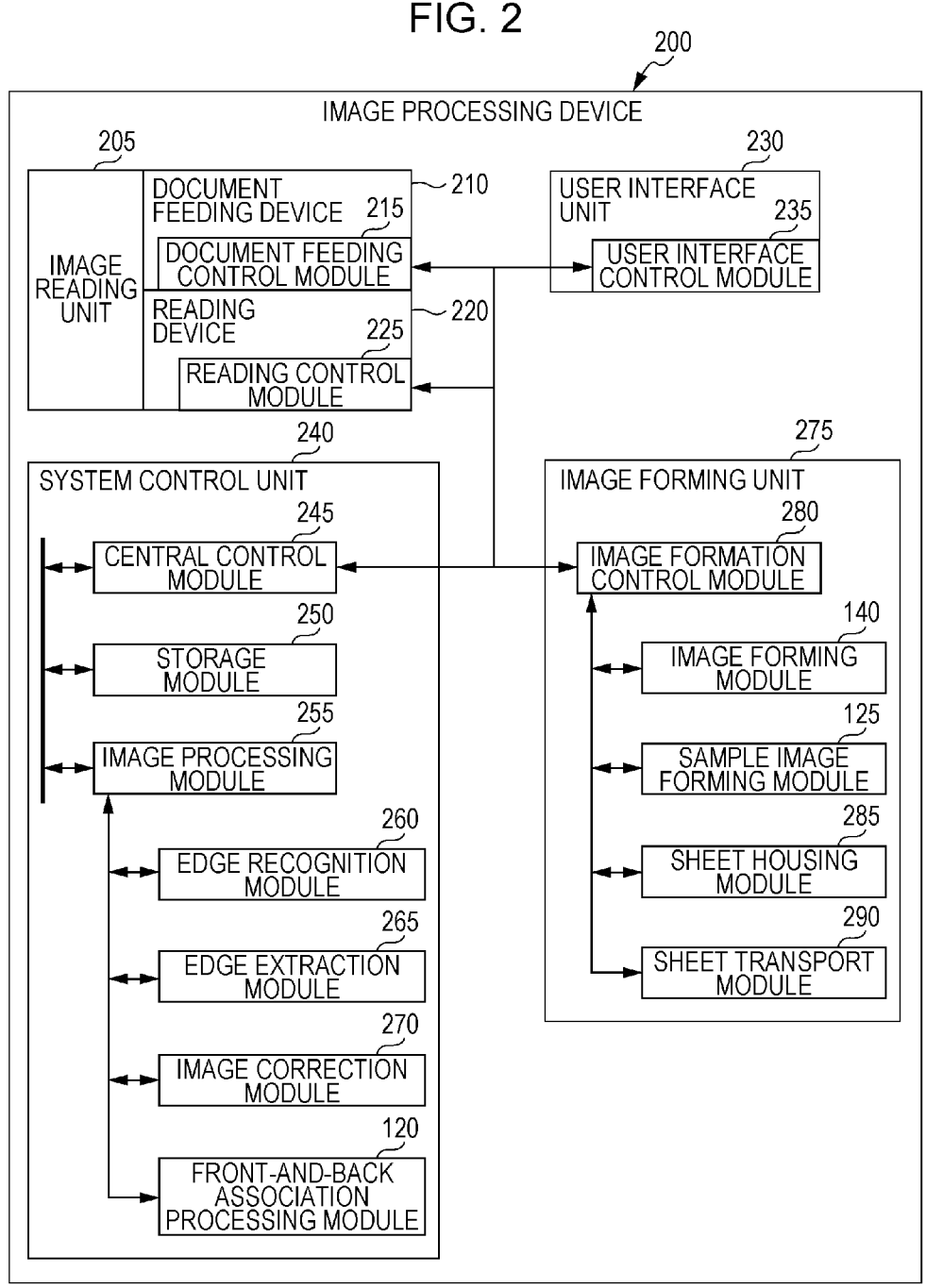

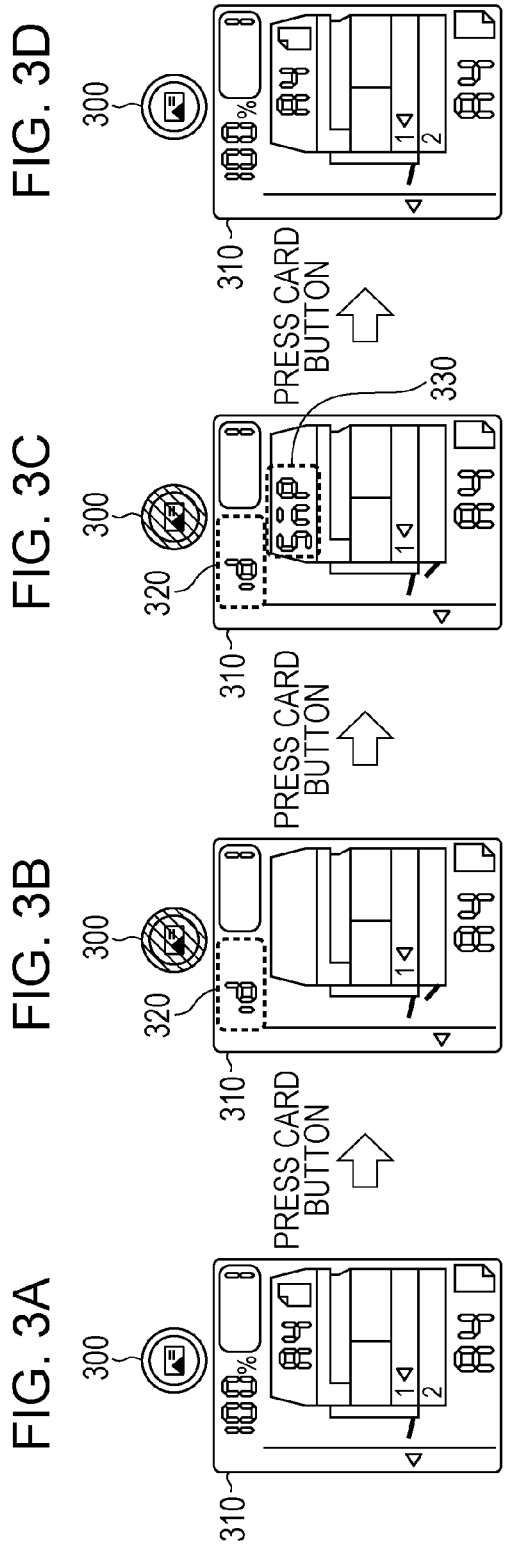

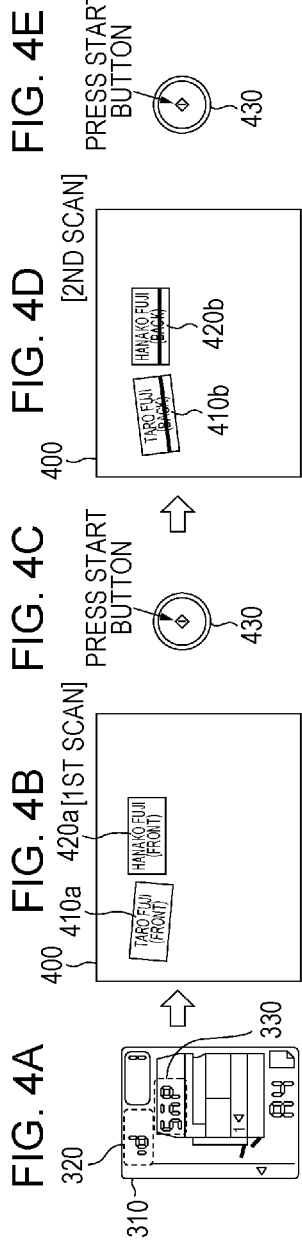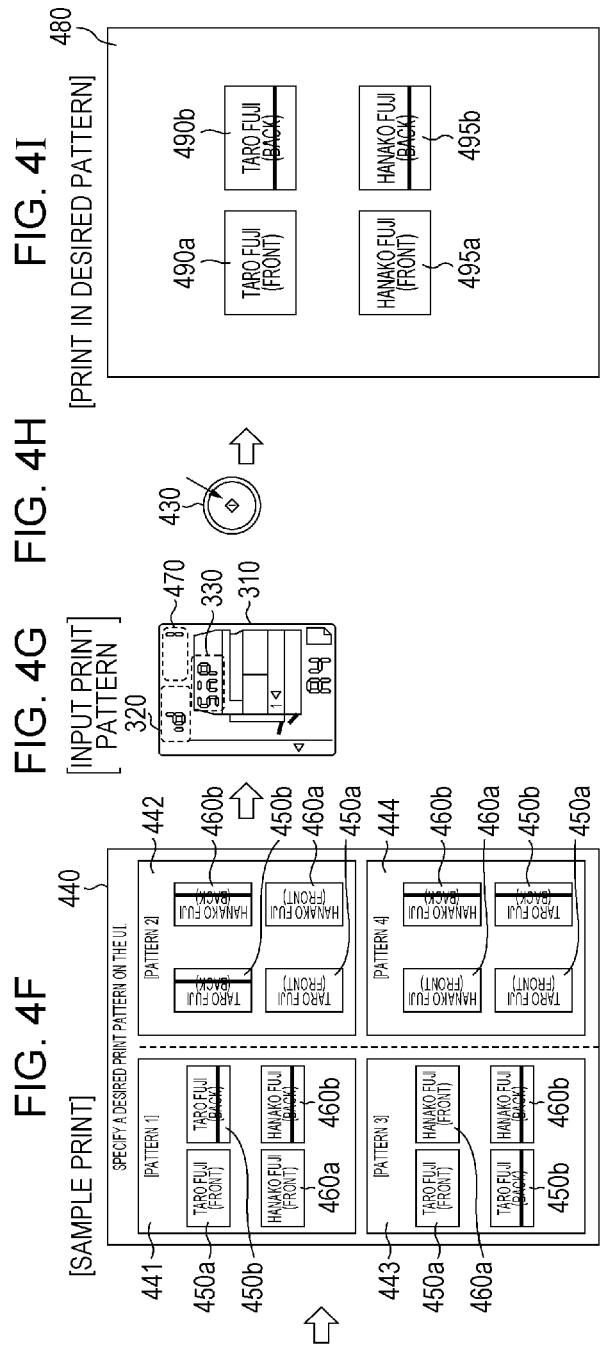

| DOCUMENT ID | FRONT SIDE COORDINATES | FRONT SIDE IMAGE | BACK SIDE COORDINATES | BACK SIDE IMAGE |
|---|---|---|---|---|
| A | (100, 50) | TARO FUJI (FRONT) | (110, 60) | TARO FUJI (BACK) |
| B | (100, 150) | HANAKO FUJI (FRONT) | (90, 140) | HANAKO FUJI (BACK) |
| C | (300, 100) | ICHIRO SUZUKI (FRONT) | (290, 110) | ICHIRO SUZUKI (BACK) |
| D | (300, 200) | JIRO SUZUKI (FRONT) | (310, 210) | JIRO SUZUKI (BACK) |
| E | (300, 300) | SABURO SUZUKI (FRONT) | (310, 310) | SABURO SUZUKI (BACK) |

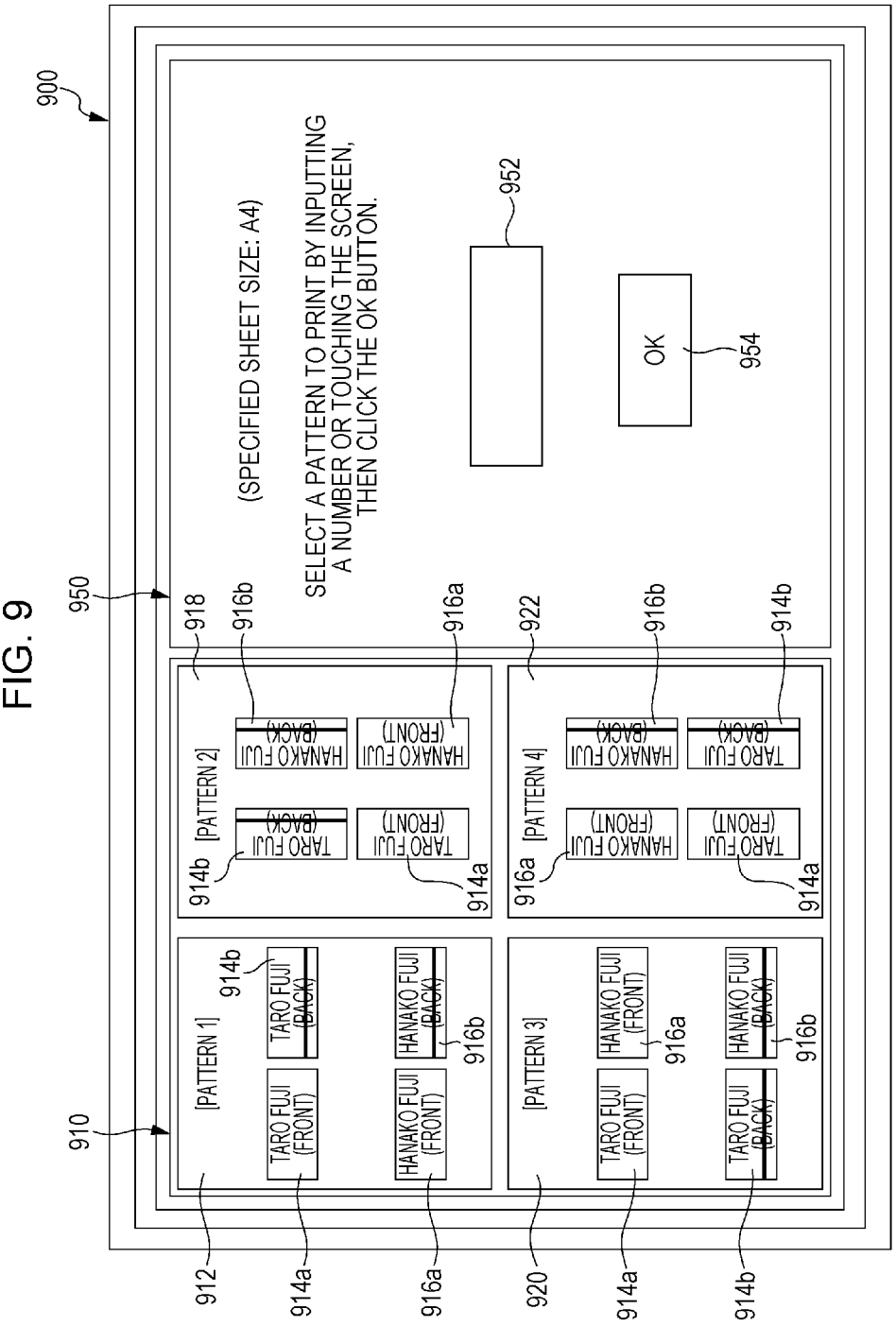

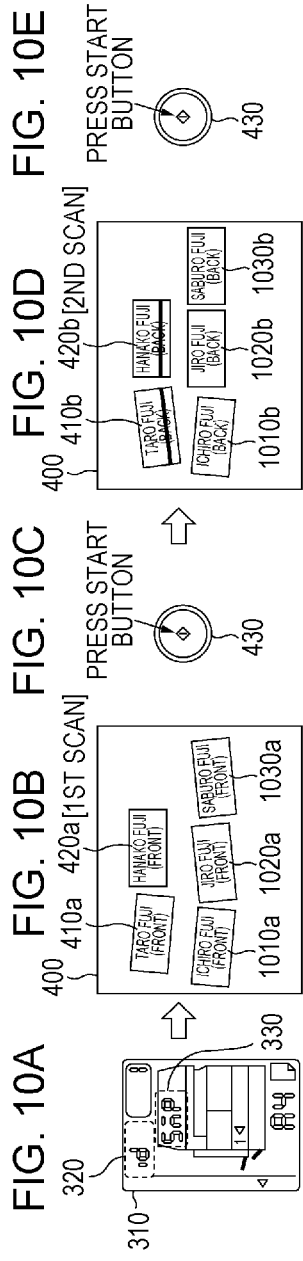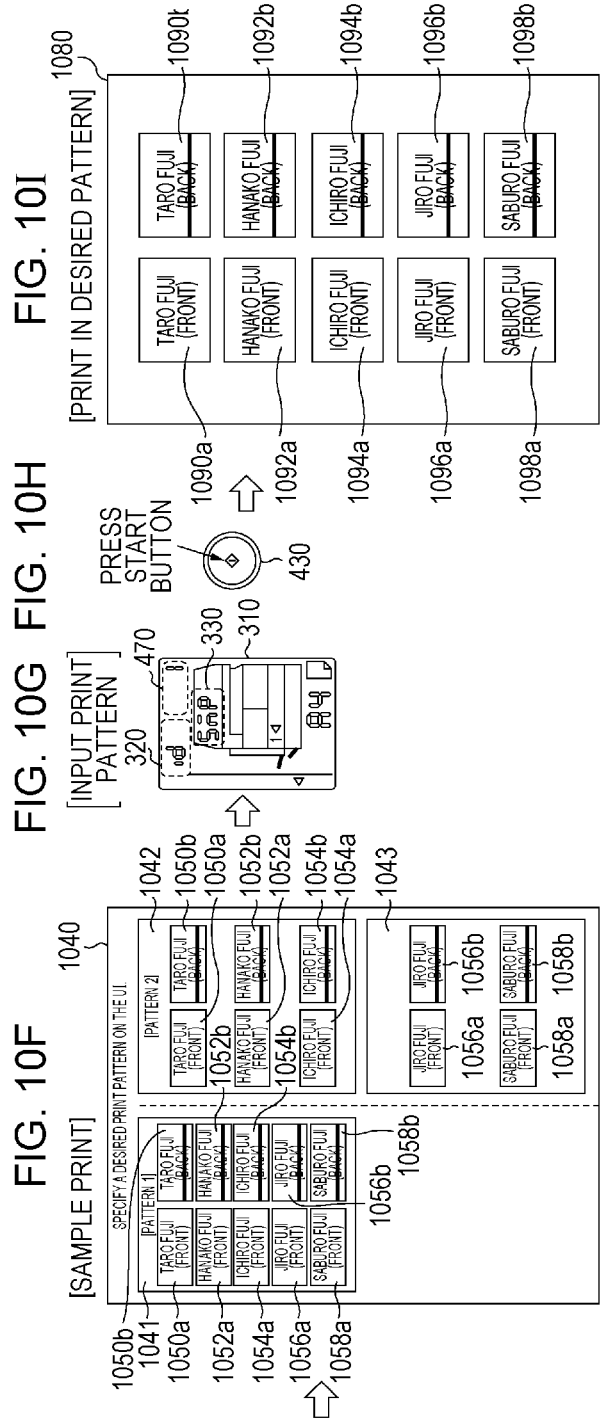

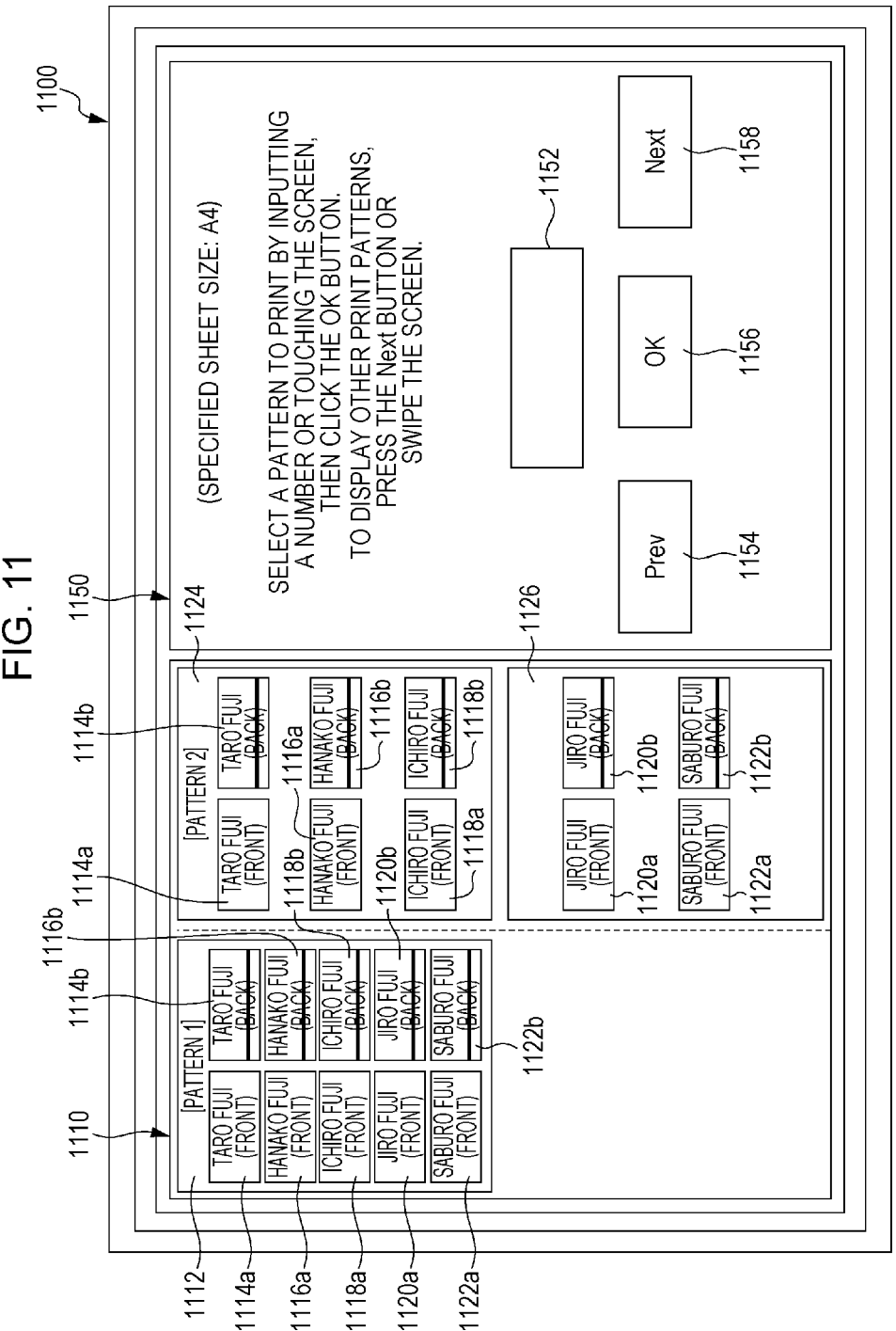

IMAGE PROCESSING DEVICE, IMAGE PROCESSING METHOD, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2016-022457 filed Feb. 9, 2016.

BACKGROUND

Technical Field

The present invention relates to an image processing device, an image processing method, and non-transitory computer-readable medium.

SUMMARY

According to an aspect of the invention, there is provided an image processing device including an association unit, a generation unit, an output unit, a reception unit, and a print unit. The association unit associates a first document image with a second image, the second image being an image of a reverse side of the first document image. The generation unit generates multiple images in accordance with a result of the association. The output unit outputs the multiple images generated by the generation unit. The reception unit receives a selection of an image output by the output unit, the selection being made by a user operation. The print unit prints the selected image.

BRIEF DESCRIPTION OF THE DRAWINGS

An exemplary embodiment of the present invention will be described in detail based on the following figures, wherein:

FIG. 1 is a schematic module configuration diagram for an exemplary configuration according to an exemplary embodiment;

FIG. 2 is an explanatory diagram illustrating an exemplary system configuration utilizing an exemplary embodiment;

FIGS. 3A to 3D are explanatory diagrams illustrating an example of a process according to an exemplary embodiment;

FIGS. 4A to 4I are explanatory diagrams illustrating an example of a process according to an exemplary embodiment;

FIG. 9 is an explanatory diagram illustrating an example of a process according to an exemplary embodiment;

FIGS. 10A to 10I are explanatory diagrams illustrating an example of a process according to an exemplary embodiment;

FIG. 11 is an explanatory diagram illustrating an example of a process according to an exemplary embodiment.

DETAILED DESCRIPTION

Figures 5, 6:
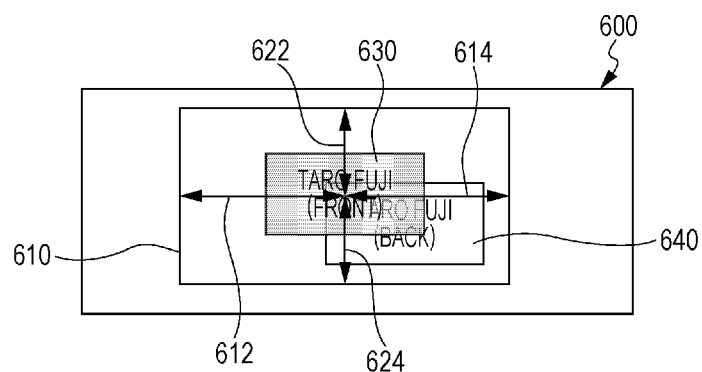
FIG. 5 is an explanatory diagram illustrating an exemplary data structure of a data table.
FIG. 6 is an explanatory diagram illustrating an example of a process according to an exemplary embodiment.

Hereinafter, an exemplary embodiment related to realizing the present invention will be described by way of example on the basis of the drawings.

FIG. 1 illustrates a schematic module configuration for an exemplary configuration according to the exemplary embodiment.

Note that the term module refers to components such as software (computer programs) and hardware which are typically capable of being logically separated. Consequently, the term module in the exemplary embodiment not only refers to modules in a computer program, but also to modules in a hardware configuration. Thus, the exemplary embodiment also serves as a description of a computer program (a program that causes a computer to execute respective operations, a program that causes a computer to function as respective units, or a program that causes a computer to realize respective functions), a system, and a method for inducing functionality as such modules. Note that although terms like "store" and "record" and their equivalents may be used in the description for the sake of convenience, these terms mean that a storage device is made to store information or that control is applied to cause a storage device to store information in the case where the exemplary embodiment is a computer program. Also, while modules may be made to correspond with function on a one-to-one basis, some implementations may be configured such that one program constitutes one module, such that one program constitutes multiple modules, or conversely, such that multiple programs constitute one module. Moreover, multiple modules may be executed by one computer, but one module may also be executed by multiple computers in a distributed or parallel computing environment. Note that a single module may also contain other modules. Also, the term "connection" may be used hereinafter to denote logical connections (such as the transfer of data and referential relationships between instructions and data) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, in accordance with conditions or states at that time, or in accordance with conditions or states up to that time. In the case of multiple "predetermined values", the predetermined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted.

Also, the terms "system" and "device" not only encompass configurations in which multiple computers, hardware, or devices are connected by a communication medium such as a network (including connections that support 1-to-1 communication), but also encompass configurations realized by a single computer, hardware, or device. The terms "device" and "system" are used interchangeably. Obviously, the term "system" does not include merely artificially arranged social constructs (social systems).

Also, every time a process is conducted by each module or every time multiple processes are conducted within a module, information to be processed is retrieved from a storage device, and the processing results are written back to the storage device after the processing. Consequently, description of the retrieval from a storage device before processing and the writing back to a storage device after processing may be reduced or omitted in some cases. Note that the storage device herein may include a hard disk, random access memory (RAM), an auxiliary or external storage medium, a storage device accessed via a communication link, and a register or the like inside a central processing unit (CPU).

The image processing device 100 according to the exemplary embodiment associates a front side image and a back side image of a document, and prints the associated document images. As illustrated in FIG. 1, the image processing device 100 includes a first image reception module 105, a second image reception module 110, an image preprocessing module 115, a front-and-back association processing module 120, a sample image forming module 125, a sample image output module 130, a print pattern reception module 135, an image forming module 140, and a print module 145.

Herein, a document image refers to an image of a card-shaped document. The card-shaped document corresponds to documents such as an identification card (such as a Japan My Number card or a U.S. Social Security card, for example), a license, or a business card. Note that the document is not limited to being card-shaped, and it is sufficient to be able to use a scanner to scan in multiple documents as a single image.

Additionally, although the document has a front side and a back side, the "image of the reverse side of the document image" is not necessarily required to be an image of the back side, and may be an image of either the front side or the back side. However, in the example given the following description, although an image of the front side is used as the first document image and an image of the back side is used as the second document image (an image of the reverse side of the first document image), the images are not limited to such an example.

Printing the front side and the back side of a document on a single sheet is desirable in some case, such as in the case of attaching documentation proving one's identity to an application form or the like. Obtaining an image of the front side and an image of the back side of a document usually involves two scans.

Furthermore, printing the front sides and the back sides of multiple documents on a single sheet is desirable in some cases, such as in the case of attaching identity documentation for all members of a family or other group to an application form or the like. In this case, if the front sides (or the back sides) of multiple documents are lined up and scanned, the work may be completed in two scans. In other words, instead of performing two scans for every single document, multiple documents may be scanned in by performing a total of two scans.

Multiple combinations (patterns) exist regarding how to print the front side and the back side of a document. Even if the front side and the back side are arranged adjacently to each other, there may be a pattern of arranging the front side on the right and the back side on the left, a pattern of arranging the front side on the left and the back side on the right, and a pattern of arranging the front side on the top and the back side on the bottom, for example. Furthermore, in the case of processing multiple documents, these patterns increase. In addition, if the case of printing a large number of documents over multiple sheets is also included, these patterns increase even more.

Meanwhile, depending on the application form or the like, the arrangement of documents to attach may be specified in some cases. If documents are simply printed out in predetermined positions, a printout conforming to the specification may not be achieved. In the case of associating and printing the front side and the back side of a document, the image processing device 100 enables one to select from multiple arrangement combinations of document images.

The first image reception module 105 is connected to the image preprocessing module 115. The first image reception module 105 reads a first image of the front side (or the back side) of a document. There may be multiple first images.

The second image reception module 110 is connected to the image preprocessing module 115. The second image reception module 110 reads a second image of the back side of a document (the back side in the case in which the first image reception module 105 reads in the front side, or the front side in the case in which the first image reception module 105 reads in the back side). There may be multiple second images.

Herein, the action of the first image reception module 105 and the second image reception module 110 receiving an image refers to, for example, reading an image with a device such as a scanner or camera, receiving an image from external equipment over a communication link via fax or the like, or loading an image stored on a device such as a hard disk (this includes devices built into a computer, as well as devices connected over a network). Images may be two-level (binary) images or multi-level images (including color images). The image to receive may be singular or plural. Additionally, it is sufficient for the content of the image to include a document discussed above.

The image preprocessing module 115 is connected to the first image reception module 105, the second image reception module 110, and the front-and-back association processing module 120. The image preprocessing module 115 performs, on an image received by the first image reception module 105 or the second image reception module 110, image processing that serves as preprocessing in order to perform the processes by the front-and-back association processing module 120 and the sample image forming module 125. Hereinafter, a document image included in the first image is designated the first document image, while a document image included in the second image is designated the second document image.

The image preprocessing module 115 extracts multiple first document images from the first image. Additionally, the image preprocessing module 115 extracts multiple second document images from the second image obtained by reading the reverse sides of the multiple first document images.

More specifically, as discussed later, the image preprocessing module 115 performs an image correction process such as noise removal with an image correction module 270, a process of extracting the edges of document images with an edge extraction module 265 (this corresponds to the process of extracting the document images), and a process of extracting features such as the position of each document image with an edge recognition module 260.

The front-and-back association processing module 120 is connected to the image preprocessing module 115 and the sample image forming module 125. The front-and-back association processing module 120 associates the first document images with the second document images, which are images of the reverse sides of the first document images. The specific processing content will be discussed later using the example in FIG. 6.

The sample image forming module 125 is connected to the front-and-back association processing module 120 and the sample image output module 130. The sample image forming module 125 generates multiple images in accordance with the result of association by the front-and-back association processing module 120, and outputs sample images for selecting a pattern discussed earlier. For example, the generated images may be reduced images (thumbnail images) of sheet images on which document images are arranged.

Additionally, the sample image forming module 125 may also generate an image for the case of printing onto a single sheet, and an image for the case of printing onto multiple sheets. For example, the sample image forming module 125 may generate an image for the case of printing onto a single sheet and an image for the case of printing onto multiple sheets, depending on the numbers of the first document images and the second document images.

The sample image output module 130 is connected to the sample image forming module 125 and the print pattern reception module 135. The sample image output module 130 outputs the multiple images generated by the sample image forming module 125.

In addition, the sample image output module 130 may also print reduced images of the multiple images generated by the sample image forming module 125. The printing in this case may be performed in a toner saver mode (also referred to as eco mode) that reduces the amount of toner compared to ordinary printing.

In addition, the sample image output module 130 may also cause a display device to display reduced images of the multiple images generated by the sample image forming module 125.

In addition, the sample image output module 130 may also output the multiple images generated by the sample image forming module 125, and codes for selecting the images. For example, the images may be labeled with codes (such as (1), (2), and so on) in the upper-right region of each image.

The print pattern reception module 135 is connected to the sample image output module 130 and the image forming module 140. The print pattern reception module 135 receives, by an operation performed by an operation, a selection of an image output by the sample image output module 130. For example, in the case of displaying the images on a display device such as a touch screen, an operation of selecting an image displayed at a certain display position using the operator's finger or the like may be performed.

Additionally, the print pattern reception module 135 may also receive a code selected by an operation performed by the operator.

The image forming module 140 is connected to the print pattern reception module 135 and the print module 145. The image forming module 140 generates, for the selected image, and image for printing onto a sheet.

Additionally, the image forming module 140, in accordance with a code received by the print pattern reception module 135, may generate an image corresponding to the code.

The print module 145 is connected to the image forming module 140. The print module 145 prints the image generated by the image forming module 140 (the image selected by the operator via the print pattern reception module 135).

Additionally, the print module 145, in accordance with a code received by the print pattern reception module 135, may print an image corresponding to the code.

FIG. 2 is an explanatory diagram illustrating an exemplary system configuration utilizing an exemplary embodiment.

The image processing device 200 is a copier or a multifunction device (that is, an image processing device having two or more functions from among scanner, printer, copier, and fax machine functions) that incorporates the image processing device 100, and includes an image reading unit 205 that reads an image of a document, a user interface unit 240 that accepts operating input from a user and displays various information to the user, a system control unit 240 that controls the operation of the image processing device 200 as a whole, and an image forming unit 275 that forms an image onto a sheet.

The image reading unit 205 is a scanner, and includes a document feeding device 210 and a reading device 220.

The document feeding device 210 includes a document feeding control module 215. The document feeding device 210 is device for automatically feeding documents to read, enabling multiple pages of documents to be read.

The document feeding control module 215 is connected to a reading control module 225, a user interface control module 235, a central control module 245, and an image formation control module 280. The document feeding control module 215 causes the document feeding device 210 to feed documents according to an instruction from the central control module 245 or the like.

The reading device 220 includes the reading control module 225. The reading device 220 includes functions corresponding to the first image reception module 105 and the second image reception module 110 illustrated in the example of FIG. 1.

The reading control module 225 is connected to the document feeding control module 215, the user interface control module 235, the central control module 245, and the image formation control module 280. The reading control module 225 causes the reading device 220 to read a document according to an instruction from the central control module 245 or the like.

The user interface unit 230 includes the user interface control module 235. The user interface unit 230 also includes, for example, presentation devices like a display device such as a liquid crystal display and an audio output device such as a speaker, and operation receiving devices such as keys and a touch panel. Note that the user interface unit 230 may also be configured to receive user operations using input methods such as a mouse, a keyboard, speech, gaze, or gestures.

The user interface control module 235 is connected to the document feeding control module 215, the reading control module 225, the central control module 245, and the image formation control module 280. The user interface control module 235 causes the user interface unit 230 to present information according to an instruction from the central control module 245 or the like, and passes received operations to the central control module 245 or the like.

Note that the user interface control module 235 may function as the sample image output module 130 in some cases. In other words, in some cases, the user interface control module 235 may cause a display device to display reduced images of the multiple images generated by the sample image forming module 125.

The system control unit 240 includes the central control module 245, a storage module 250, an image processing module 255, the edge recognition module 260, the edge extraction module 265, the image correction module 270, and the front-and-back association processing module 120.

The central control module 245 is connected to the storage module 250, the image processing module 255, the document feeding control module 215, the reading control module 225, the user interface control module 235, and the image formation control module 280. The central control module 245 controls the image reading unit 205, the user interface unit 230, and the image forming unit 275 in order to exhibit functionality as the image processing device 200.

The storage module 250 is connected to the central control module 245 and the image processing module 255. The storage module 250 includes memory, a hard disk, or the like, and stores information such as images and processing results from the image processing module 255.

The image processing module 255 is connected to the central control module 245, the storage module 250, the edge recognition module 260, the edge extraction module 265, the image correction module 270, and the front-and-back association processing module 120. The image processing module 255 controls components such as the edge recognition module 260 to process an image read by the image reading unit 205. Additionally, the image processing module 255 includes functions corresponding to the sample image forming module 125 illustrated in the example of FIG. 1.

The image correction module 270 is connected to the image processing module 255. The image correction module 270 performs correction processing such as noise removal and tilt correction on an image read by the image reading unit 205. These correction processes may use established technology.

The edge extraction module 265 is connected to the image processing module 255. The edge extraction module 265 extracts the edges of a document image in an image. The edge extraction process may use established technology. For example, the Sobel filter, which extracts portions where the density value of an image changes suddenly as edges, may be used.

The edge recognition module 260 is connected to the image processing module 255. The edge recognition module 260 extracts a rectangular image (card-shaped image) of predetermined size from the edges extracted by the edge extraction module 265.

The front-and-back association processing module 120 is connected to the image processing module 255.

The image processing module 255, the edge recognition module 260, the edge extraction module 265, and the image correction module 270 include functions corresponding to the image preprocessing module 115 illustrated in the example of FIG. 1.

The image forming unit 275 is a printer, and includes the image formation control module 280, the image forming module 140, the sample image forming module 125, a sheet housing module 285, and a sheet transport module 290. The image forming unit 275 includes functions corresponding to the print module 145 illustrated in the example of FIG. 1.

The image formation control module 280 is connected to the image forming module 140, the sample image forming module 125, the sheet housing module 285, the sheet transport module 290, the document feeding control module 215, the reading control module 225, the user interface control module 235, and the central control module 245. The image formation control module 280 controls components such as the image forming module 140 to print an image onto a sheet (printout).

The image forming module 140 is connected to the image formation control module 280.

The sample image forming module 125 is connected to the image formation control module 280.

The sheet housing module 285 is connected to the image formation control module 285. The sheet housing module 285 houses and supplies sheets.

The sheet transport module 290 is connected to the image formation control module 280. The sheet transport module 290 transports a sheet from the sheet housing module 285 to the image formation control module 280 for printing.

FIGS. 3A to 3D are explanatory diagrams illustrating an example of a process according to the exemplary embodiment.

The user interface unit 230 includes a card button 300 and a display screen 310, for example. This illustrates an example of a case in which a display device capable of displaying sample images is not included (also called a poor UI), and sample images are printed.

The example illustrated in FIG. 3A illustrates the state before the card button 300 is pressed (a general copy mode state). On the display screen 310, information such as the copy scale (100% in FIG. 3A), the number of copies (1 in FIG. 3A), and the sheet size (A4 in FIG. 3A) is illustrated.

At this point, if the card button 300 is pressed by an operation performed by the operator, the state switches to the state illustrated in the example of FIG. 3B. The card button 300 may be changed from an OFF or unlighted state to an ON or lighted state. Subsequently, in a card copy mode display area 320 of the display screen 310 (the area where the copy scale is displayed in FIG. 3A), a display is presented to indicate that the mode has switched to a mode of conducting a card-shaped document copy process according to the present exemplary embodiment (ID card copy mode). In FIG. 3B, "id" is displayed.

Next, if the card button 300 is pressed again by an operation performed by the operator, the state switches to the state illustrated in the example of FIG. 3C. At this point, in the sample print mode display area 330 of the display screen 310, a display is presented to indicate that the mode has switched to a mode of conducting a process according to the present exemplary embodiment (ID card sample print mode). In FIG. 3C, "smp" is displayed.

Note that, from this state, if the card button 300 is pressed again by an operation performed by the operator, the state switches to the state illustrated in the example of FIG. 3D. Namely, the state switches to the general copy mode state, returning to the state of the example illustrated in FIG. 3A. Consequently, the card button 300 reverts from the ON or lighted state back to the OFF or unlighted state, and the display on the display screen 310 is also reverted.

FIGS. 4A to 4I are explanatory diagrams illustrating an example of a process according to the exemplary embodiment.

The example illustrated in FIG. 4A is the same as the state illustrated in the example of FIG. 3C. In other words, the state is a state in which the ID card sample print mode is specified.

Next, the operator arranges a card (Taro Fuji (front)) 410*a* and a card (Hanako Fuji (front)) 420*a* on a document bed 400, like in the example illustrated in FIG. 4B.

At this point, if it is detected that a Start button 430 is pressed by an operation performed by the operator, like in the example illustrated in FIG. 4C, a first scan is conducted, and an image including document images of the card (Taro Fuji (front)) 410*a* and the card (Hanako Fuji (front)) 420*a* is generated.

After the scan finishes, the operator arranges a card (Taro Fuji (back)) 410*b* and a card (Hanako Fuji (back)) 420*b* on the document bed 400, like in the example illustrated in FIG. 4D. In other words, from the state illustrated in the example of FIG. 4B, each document is flipped over at the same position.

At this point, if it is detected that the Start button 430 is pressed by an operation performed by the operator, like in the example illustrated in FIG. 4E, a second scan is conducted, and an image including document images of the card (Taro Fuji (back)) 410*b* and the card (Hanako Fuji (back)) 420*b* is generated.

After that, the processes by the image preprocessing module 115 and the front-and-back association processing module 120 are conducted, and the association between the document image of the card (Taro Fuji (front)) 410*a* and the document image of the card (Taro Fuji (back)) 410*b*, as well as the association between the document image of the card (Hanako Fuji (front)) 420*a* and the document image of the card (Hanako Fuji (back)) 420*b*, are extracted.

The process results are stored in a data table 500, for example. FIG. 5 is an explanatory diagram illustrating an exemplary data structure of the data table 500. The data table 500 includes a document ID field 510, a front side coordinates field 520, a front side image field 530, a back side coordinates field 540, and a back side image field 550. The document ID field 510 stores information (a document identification (ID)) for identifying a pair of document images (the front side image and the back side image of a card image) uniquely in the present exemplary embodiment. The front side coordinates field 520 stores front side coordinates, such as the center coordinates of the front side image, for example. The front side image field 530 stores the front side image. For example, the front side image field 530 may store the front side image itself, or information such as the name of a file storing the front side image. The back side coordinates field 540 stores back side coordinates, such as the center coordinates of the back side image, for example. The back side image field 550 stores the back side image. For example, the back side image field 550 may store the back side image itself, or information such as the name of a file storing the back side image.

The sample image forming module 125 generates the images on the sheet 440 illustrated in the example of FIG. 4F. Namely, four varieties (print pattern 441, print pattern 442, print pattern 443, and print pattern 444) are illustrated as arrangement patterns of the document image of the card (Taro Fuji (front)) 410*a*, the document image of the card (Taro Fuji (back)) 410*b*, the document image of the card (Hanako Fuji (front)) 420*a*, and the document image of the card (Hanako Fuji (back)) 420*b*. As the print pattern 441, the document images are oriented horizontally (with the long edge horizontal), with a card image sample (Taro Fuji (front)) 450*a* and a card image sample (Taro Fuji (back)) 450*b* arranged from left to right, and underneath, a card image sample (Hanako Fuji (front)) 460*a* and a card image sample (Hanako Fuji (back)) 460*b* arranged from left to right. As the print pattern 442, the document images are oriented vertically (with the long edge vertical), with the card image sample (Taro Fuji (front)) 450*a* and the card image sample (Taro Fuji (back)) 450*b* arranged from left to right (in the drawing, from bottom to top), and underneath (in the drawing, to the right), the card image sample (Hanako Fuji (front)) 460*a* and the card image sample (Hanako Fuji (back)) 460*b* arranged from left to right (in the drawing, from bottom to top). As the print pattern 443, the document images are oriented horizontally, with the card image sample (Taro Fuji (front)) 450*a* and the card image sample (Taro Fuji (back)) 450*b* arranged from top to bottom, and to the right, the card image sample (Hanako Fuji (front)) 460*a* and the card image sample (Hanako Fuji (back)) 460*b* arranged from top to bottom. As the print pattern 444, the document images are oriented vertically, with the card image sample (Taro Fuji (front)) 450*a* and the card image sample (Taro Fuji (back)) 450*b* arranged from top to bottom (in the drawing, from left to right), and to the right (in the drawing, above), the card image sample (Hanako Fuji (front)) 460*a* and the card image sample (Hanako Fuji (back)) 460*b* arranged from top to bottom (in the drawing, from left to right). Note that at the top of each pattern, the code "[Pattern N]" (where N is from 1 to 4) is displayed.

Subsequently, the sample image output module 130 prints the sheet 440.

Next, the operator inspects the printed sheet 440, and decides which pattern to use for printing. For example, suppose that Pattern 1, namely the print pattern 441, is selected. The operator presses the [1] key on a keypad of the user interface unit 230. On the display screen 310, the pressed result is displayed, as illustrated by the example of FIG. 4G. In the example of FIG. 4G, the pattern code is displayed in a print pattern number display area 470 (the area indicating the number of copies in the general copy mode).

At this point, if it is detected that the Start button 430 is pressed by an operation performed by the operator, like in the example illustrated in FIG. 4H, the print module 145 prints a sheet 480 illustrated by the example of FIG. 4I. On the sheet 480, the document images are arranged in an arrangement similar to the selected print pattern 441. In other words, the document images are oriented horizontally (with the long edge horizontal), with a card image (Taro Fuji (front)) 490*a* and a card image (Taro Fuji (back)) 490*b* arranged from left to right, and underneath, a card image (Hanako Fuji (front)) 495*a* and a card image (Hanako Fuji (back)) 495*b* arranged from left to right.

FIG. 6 is an explanatory diagram illustrating an example of a process by the exemplary embodiment (the front-and-back association processing module 120).

If a card image (Taro Fuji (back)) 640 exists in an association region 610 within a front-and-back association length (up) 622 in the upward direction, a front-and-back association length (down) 624 in the downward direction, a front-and-back association width (left) 612 in the leftward direction, and a front-and-back association width (right) 614 in the rightward direction from the center coordinates of the card image (Taro Fuji (front)) 630, the card image (Taro Fuji (back)) 640 is judged to be the back side image of the card image (Taro Fuji (front)) 630.

(1) The absolute coordinates of the documents (the center coordinates of the front side images and the back side images) are extracted from the image of the scan result.

(2) The front-and-back association process is conducted.

If the back side coordinates are within a front-and-back association determination length extending in the positive and negative directions from the x coordinate of the front side coordinates (the front-and-back association width (left) 612 and the front-and-back association width (right) 614), and also within a front-and-back association determination width extending in the positive and negative directions from the y coordinate of the front side coordinates (the front-and-back association length (up) 622 and the front-and-back association length (down) 624), the back side coordinates are associated with the corresponding front side coordinates, and thus the front side image and the back side image are associated with each other.

This process is for associating the front and back sides of a document even if the position of the document is shifted slightly by the operation of flipping over the document by the user.

Figure 7:
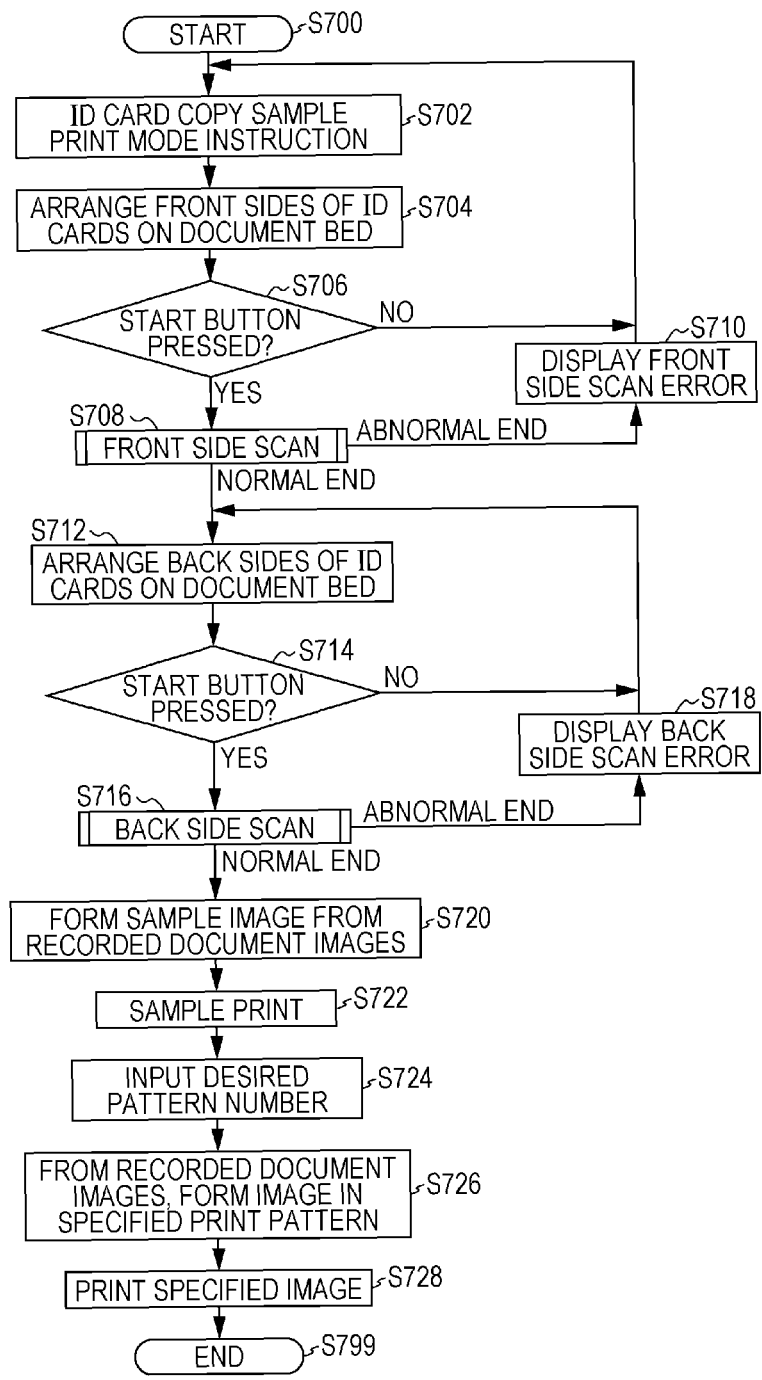
FIG. 7 is a flowchart illustrating an example of a process according to an exemplary embodiment.

FIG. 7 is a flowchart illustrating an exemplary process according to the exemplary embodiment. The steps outlined in bold in FIG. 7 indicate a user operation or the detection of such an operation.

In step S702, an ID card copy sample print mode instruction is given.

In step S704, the front sides of ID cards (one or multiple) are arranged on the document bed.

In step S706, it is determined whether or not the Start button is pressed, and if pressed, the flow proceeds to step S708. Otherwise, the flow returns to step S702.

In step S708, the front sides are scanned. Details of the process in step S708 will be discussed later using the flowchart illustrated by the example of FIG. 8. If the process of step S708 ends normally, the flow proceeds to step S712, whereas if the process of step S708 ends abnormally, the flow proceeds to step S710.

In step S710, a front side scan error display is presented, and the flow returns to step S702.

In step S712, the back sides of ID cards (one or multiple) are arranged on the document bed. In other words, the operator performs an operation of flipping over the ID cards at the same position.

In step S714, it is determined whether or not the Start button is pressed, and if pressed, the flow proceeds to step S716. Otherwise, the flow returns to step S712.

In step S716, the back sides are scanned. Details of the process in step S716 will be discussed later using the flowchart illustrated by the example of FIG. 8. If the process of step S716 ends normally, the flow proceeds to step S720, whereas if the process of step S716 ends abnormally, the flow proceeds to step S718.

In step S718, a back side scan error display is presented, and the flow returns to step S712.

In step S720, sample images are formed from the recorded document images.

In step S722, sample printing is conducted.

In step S724, a pattern number is input by a user operation.

In step S726, an image is formed from the recorded document images using the specified print pattern.

In step S728, the specified image is printed.

Figure 8:
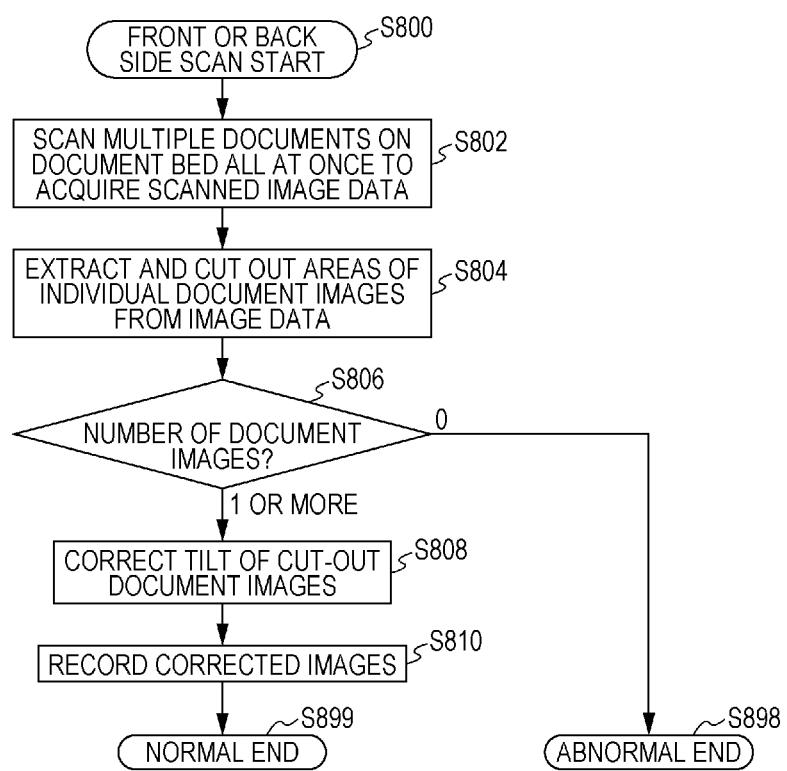
FIG. 8 is a flowchart illustrating an example of a process according to an exemplary embodiment.

FIG. 8 is a flowchart illustrating an example of a process according to the exemplary embodiment.

In step S800, a front side scan or a back side scan is started.

In step S802, multiple documents on the document bed are scanned all at once, and image data is acquired.

In step S804, the regions of individual document images are extracted and cut out from the image data.

In step S806, the number of document images is determined, and if there are one or more document images, the flow proceeds to step S808. If there are zero document images, the flow proceeds to "abnormal end" (step S898). Also, in the case of the second scan (step S716), it may also be determined whether or not the number of document images is the same as the number of document images in the first scan. If the numbers of document images are the same, the flow proceeds to step S808, but if different, the flow may also proceed to "abnormal end" (step S898).

In step S808, the tilt of the cut-out document images is corrected.

In step S810, the corrected images are registered in the data table 500, and the flow proceeds to "normal end" (step S899).

FIG. 9 is an explanatory diagram illustrating an example of a process according to the exemplary embodiment.

The user interface unit 230 includes a screen 900, for example. This illustrates an example of a case in which a display device capable of displaying sample images is included (also called a rich UI), and sample images are displayed on the screen 900.

On the screen 900, a print thumbnail screen 910 and a message input screen 950 are displayed.

On the print thumbnail screen 910, a print pattern 912, a print pattern 918, a print pattern 920, and a print pattern 922, which are thumbnails of print patterns, are displayed. In each of the print pattern 912, the print pattern 918, the print pattern 920, and the print pattern 922, a card image sample (Taro Fuji (front)) 914a, a card image sample (Taro Fuji (back)) 914b, a card image sample (Hanako Fuji (front)) 916a, and a card image sample (Hanako Fuji (back)) 916b are displayed. Content similar to the sheet 440 illustrated in the example of FIG. 4F is displayed.

On the message input screen 950, a pattern reception area 952 and an OK button 954 are displayed. For example, the message "(Specific Sheet Size: A4) Select a pattern to print by inputting a number or touching the screen, then click the OK button" is displayed, enabling the user to select one of the four patterns on the print thumbnail screen 910.

FIGS. 10A to 10I are explanatory diagrams illustrating an example of a process according to the exemplary embodiment, and illustrate an example of a process in a case in which the scanned documents are greater than, or equal to or greater than, a predetermined number. Note that the "predetermined number" is a number determined by the sheet size to print on and the document size of the scanned documents. The document size may be detected by a selection operation performed by the user, or a result extracted by the process of the edge recognition module 260 may be used. Note that the example illustrated in FIG. 10 illustrates an example of a case in which a display device capable of displaying sample images is not included (also called a poor UI), and sample images are printed.

On the user interface unit 230, an example is illustrated in which the ID card copy sample print mode and a sheet size of A4 are specified, and the front sides and the back sides of documents are scanned respectively. In the example of FIGS. 10A to 10I, there are five front sides and five back sides of the documents. A pattern that prints onto one page of the specified sheet size of A4, and a pattern that prints onto two pages, are printed as samples.

The user is able to obtain a desired print result by specifying on the user interface unit 230 a desired pattern from among the print results.

The example illustrated in FIG. 10A is the same as the state illustrated in the example of FIG. 3C. In other words, the state is a state in which the ID card sample print mode is specified.

Next, like the example illustrated in FIG. 10B, the operator arranges the card (Taro Fuji (front)) 410a, the card (Hanako Fuji (front)) 420a, a card (Ichiro Fuji (front)) 1010a, a card (Jiro Fuji (front)) 1020a, and a card (Saburo Fuji (front)) 1030a on the document bed 400.

At this point, if it is detected that a Start button 430 is pressed by an operation performed by the operator, like in the example illustrated in FIG. 10C, a first scan is conducted, and an image including document images of the card (Taro Fuji (front)) 410*a*, the card (Hanako Fuji (front)) 420*a*, the card (Ichiro Fuji (front)) 1010*a*, the card (Jiro Fuji (front)) 1020*a*, and the card (Saburo Fuji (front)) 1030*a* is generated.

After the scan finishes, like the example illustrated in FIG. 10D, the operator arranges the card (Taro Fuji (back)) 410*a*, the card (Hanako Fuji (back)) 420*b*, a card (Ichiro Fuji (back)) 1010*b*, a card (Jiro Fuji (back)) 1020*b*, and a card (Saburo Fuji (back)) 1030*b* on the document bed 400. In other words, from the state illustrated in the example of FIG. 10B, each document is flipped over at the same position.

At this point, if it is detected that the Start button 430 is pressed by an operation performed by the operator, like in the example illustrated in FIG. 10E, a second scan is conducted, and an image including document images of the card (Taro Fuji (back)) 410*b*, the card (Hanako Fuji (back)) 420*b*, the card (Ichiro Fuji (back)) 1010*b*, the card (Jiro Fuji (back)) 1020*b*, and the card (Saburo Fuji (back)) 1030*b* is generated.

After that, the processes by the image preprocessing module 115 and the front-and-back association processing module 120 are conducted, and the association between the document image of the card (Taro Fuji (front)) 410*a* and the document image of the card (Taro Fuji (back)) 410*b*, the association between the document image of the card (Hanako Fuji (front)) 420*a* and the document image of the card (Hanako Fuji (back)) 420*b*, the association between the document image of the card (Ichiro Fuji (front)) 1010*a* and the document image of the card (Ichiro Fuji (back)) 1010*b*, the association between the document image of the card (Jiro Fuji (front)) 1020*a* and the document image of the card (Jiro Fuji (back)) 1020*b*, and the association between the document image of the card (Saburo Fuji (front)) 1030*a* and the document image of the card (Saburo Fuji (back)) 1030*b* are extracted. Subsequently, the process results are stored in the data table 500, for example.

The sample image forming module 125 generates the images on the sheet 1040 illustrated in the example of FIG. 10F. Namely, two varieties (print pattern (1) 1041, print pattern (2) 1042, and print pattern (2) 1043) are illustrated as arrangement patterns of the document image of the card (Taro Fuji (front)) 410*a*, the document image of the card (Taro Fuji (back)) 410*b*, the document image of the card (Hanako Fuji (front)) 420*a*, the document image of the card (Hanako Fuji (back)) 420*b*, the document image of the card (Ichiro Fuji (front)) 1010*a*, the document image of the card (Ichiro Fuji (back)) 1010*b*, the document image of the card (Jiro Fuji (front)) 1020*a*, the document image of the card (Jiro Fuji (back)) 1020*b*, the document image of the card (Saburo Fuji (front)) 1030*a*, and the document image of the card (Saburo Fuji (back)) 1030*b*. As the print pattern 1041, the document images are oriented horizontally (with the long edge horizontal), with the respective document images of a front side and a back side arranged from left to right, and the respective combinations of the document images of the front and back sides arranged vertically. In other words, with the print pattern 1041, a total of 10 document images are printed onto a single sheet. With the other pattern, the document images are printed onto two sheets using the print pattern (2) 1042 and the print pattern (2) 1043. In other words, a total of six document images are printed onto one sheet, while the remaining four document images are printed onto another sheet. Note that at the top of each pattern, the code "[Pattern N]" (where N is 1 or 2) is displayed.

Subsequently, the sample image output module 130 prints the sheet 1040.

Next, the operator inspects the printed sheet 1040, and decides which pattern to use for printing. For example, suppose that Pattern 1, namely the print pattern (1) 1041, is selected. The operator presses the [1] key on a keypad of the user interface unit 230. On the display screen 310, the pressed result is displayed, as illustrated by the example of FIG. 10G. In the example of FIG. 10G, the pattern code is displayed in a print pattern number display area 470 (the area indicating the number of copies in the general copy mode).

At this point, if it is detected that the Start button 430 is pressed by an operation performed by the operator, like in the example illustrated in FIG. 10H, the print module 145 prints a sheet 1080 illustrated by the example of FIG. 10I. On the sheet 1080, the document images are arranged in an arrangement similar to the selected print pattern (1) 1041. In other words, the document images are oriented horizontally (with the long edge horizontal), and on the single sheet 1080, a card image (Taro Fuji (front)) 1090*a* and a card image (Taro Fuji (back)) 1090*b* are arranged from left to right, and underneath, a card image (Hanako Fuji (front)) 1092*b* and a card image (Hanako Fuji (back)) 1092*b* are arranged from left to right, and underneath, a card image (Ichiro Fuji (front)) 1094*a* and a card image (Ichiro Fuji (back)) 1094*b* are arranged from left to right, and underneath, a card image (Jiro Fuji (front)) 1096*a* and a card image (Jiro Fuji (back)) 1096*b*, and underneath, a card image (Saburo Fuji (front)) 1098*a* and a card image (Saburo Fuji (back)) 1098*b* are arranged from left to right.

FIG. 11 is an explanatory diagram illustrating an example of a process according to the exemplary embodiment.

The user interface unit 230 includes a screen 1100, for example. This illustrates an example of a case in which a display device capable of displaying sample images is included (also called a rich UI), and sample images are displayed on the screen 1100.

On the screen 1100, a print thumbnail screen 1110 and a message input screen 1150 are displayed.

On the print thumbnail screen 1110, print pattern thumbnails, specifically, Pattern 1 which is a print pattern 1112, and Pattern 2 which is a print pattern 1124 and a print pattern 1126, are displayed. Content similar to the sheet 1040 illustrated in the example of FIG. 10F is displayed. In other words, in the print pattern 1112, a card image sample (Taro Fuji (front)) 1114*a*, a card image sample (Taro Fuji (back)) 1114*b*, a card image sample (Hanako Fuji (front)) 1116*a*, a card image sample (Hanako Fuji (back)) 1116*b*, a card image sample (Ichiro Fuji (front)) 1118*a*, a card image sample (Ichiro Fuji (back)) 1118*b*, a card image sample (Jiro Fuji (front)) 1120*a*, a card image sample (Jiro Fuji (back)) 1120*b*, a card image sample (Saburo Fuji (front)) 1122*a*, and a card image sample (Saburo Fuji (back)) 1122*b* are displayed. In the print pattern 1124, the card image sample (Taro Fuji (front)) 1114*a*, the card image sample (Taro Fuji (back)) 1114*b*, the card image sample (Hanako Fuji (front)) 1116*a*, the card image sample (Hanako Fuji (back)) 1116*b*, the card image sample (Ichiro Fuji (front)) 1118*a*, and the card image sample (Ichiro Fuji (back)) 1118*b* are displayed. In the print pattern 1126, the card image sample (Jiro Fuji (front)) 1120*a*, the card image sample (Jiro Fuji (back)) 1120*b*, the card image sample (Saburo Fuji (front)) 1122*a*, and the card image sample (Saburo Fuji (back)) 1122*b* are displayed.

On the message input screen 1150, a pattern reception area 1152, a Prev button 1154, an OK button 1156, and a Next button 1158 are displayed. For example, the message "(Specific Sheet Size: A4) Select a pattern to print by inputting a number or touching the screen, then click the OK button. To display other print patterns, press the Next button or swipe the screen." is displayed, enabling the user to select one of the two patterns on the print thumbnail screen 1110. Note that, unlike the example illustrated in FIGS. 10A to 10I, the number of patterns may also be increased. This is because in the example of FIG. 11, the print patterns are not actually printed, but instead displayed on the screen 1100, thereby avoiding the consumption of paper.

An exemplary hardware configuration of an image processing device according to an exemplary embodiment will now be described with reference to FIG. 12. The configuration illustrated in FIG. 12 may be realized by a personal computer (PC), for example, and illustrates an exemplary hardware configuration equipped with a data reading unit 1217 such as a scanner, and a data output unit 1218 such as a printer.

The central processing unit (CPU) 1201 is a controller that executes processing according to a computer program that states execution sequences for the various modules described in the foregoing exemplary embodiment, or in other words, for respective modules such as the first image reception module 105, the second image reception module 110, the image preprocessing module 115, the front-and-back association processing module 120, the sample image forming module 125, the sample image output module 130, the print pattern reception module 135, the image forming module 140, the print module 145, the document feeding control module 215, the reading control module 225, the user interface control module 235, the central control module 245, the image processing module 255, the edge recognition module 260, the edge extraction module 265, the image correction module 270, the image formation control module 280, the sheet housing module 285, and the sheet transport module 290.

The read-only memory (ROM) 1202 stores information such as programs and computational parameters used by the CPU 1201. The random access memory (RAM) 1203 stores information such as programs used during execution by the CPU 1201, and parameters that change as appropriate during such execution. These memory units are connected to each other by a host bus 1204 realized by a CPU bus, for example.

The host bus 1204 is connected to an external bus 1206 such as a Peripheral Component Interconnect/Interface (PCI) bus via the bridge 1205.

The keyboard 1208 and the mouse or other pointing device 1209 are devices operated by a user. The display 1210 may be a liquid crystal display (LCD) or cathode ray tube (CRT) device, and displays various information as text and image information. Additionally, a device such as a touchscreen equipped with the functions of both the pointing device 1209 and the display 1210 is also acceptable.

The hard disk drive (HDD) 1211 houses and drives a hard disk (which may also be flash memory or the like), causing programs executed by the CPU 1201 and information to be recorded thereto or retrieved therefrom. Information such as images, the data table 500, and the processing results of respective modules is stored on the hard disk. Additionally, information such as various other data and various computer programs are stored therein.

The drive 1212 reads out data or programs recorded onto a removable recording medium 1213 such as an inserted magnetic disk, optical disc, magneto-optical disc, or semiconductor memory, and supplies the data or programs to the RAM 1203 connected via the interface 1207, the external bus 1206, the bridge 1205, and the host bus 1204. Note that the removable recording medium 1213 is also usable as a data recording area.

The connection port 1214 is a port that connects to externally connected equipment 1215, and has a USB, IEEE 1394, or similar receptacle. The connection port 1214 is connected to the CPU 1201 via the interface 1207, the external bus 1206, the bridge 1205, and the host bus 1204. The communication unit 1216 is connected to a communication link and executes data communication processing with external equipment. The data reading unit 1217 may be a scanner, for example, and executes document scanning processing. The data output unit 1218 may be a printer, for example, and executes document data output processing.

Figure 12:
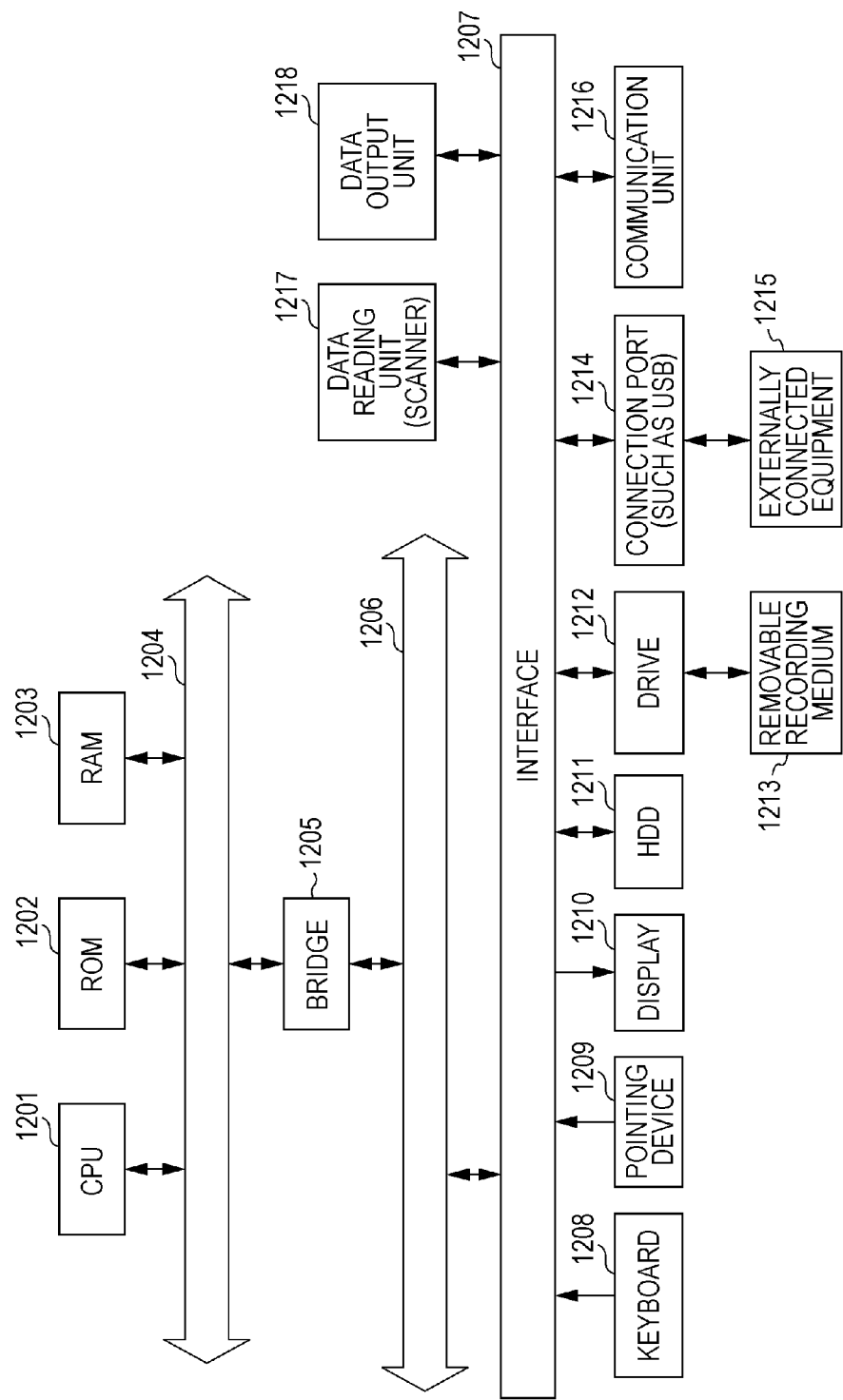
FIG. 12 is a block diagram illustrating an exemplary hardware configuration of a computer that realizes an exemplary embodiment.

Note that the hardware configuration of an image processing device illustrated in FIG. 12 illustrates a single exemplary configuration, and that an exemplary embodiment is not limited to the configuration illustrated in FIG. 12 insofar as the configuration still enables execution of the modules described in an exemplary embodiment. For example, some modules may also be realized with special-purpose hardware (such as an application-specific integrated circuit (ASIC), for example), and some modules may be configured to reside within an external system and be connected via a communication link. Furthermore, it may also be configured such that multiple instances of the system illustrated in FIG. 12 are connected to each other by a communication link and operate in conjunction with each other.

In the foregoing exemplary embodiment, the operator is prompted to select a print pattern every time the print module 145 prints, but the previously selected print pattern may also be used without prompting the operator to select a print pattern (in other words, without switching to sample print mode). In other words, the print pattern reception module 135 receives the selection made by the previous operation of the operator as the current selection.

In addition, if document images different in number from the document images in the previously selected print pattern are extracted from the scanned image, the operator may be prompted to select a print pattern, without using the previous print pattern. Obviously, if document images that are the same in number as the document images in the previously selected print pattern are extracted from the scanned image, the previous print pattern may also be used. In other words, the print pattern reception module 135 prompts the operator to select a print pattern in cases in which document images different in number from the previously selected document images are extracted from the scanned image.

In addition, if a predetermined amount of time has elapsed since the previous printing, the operator may be prompted to select a print pattern, without using the previous print pattern. Obviously, if the predetermined amount of time has not yet elapsed since the previous printing, the previous print pattern may also be used. In other words, the print pattern reception module 135 prompts the operator to select a print pattern in cases in which a predetermined amount of time has elapsed since the previous printing.

Note that the described program may be provided stored in a recording medium, but the program may also be provided via a communication medium. In this case, a computer-readable recording medium storing a program, for example, may also be taken to be an exemplary embodiment of the present invention with respect to the described program.

A "computer-readable recording medium storing a program" refers to a computer-readable recording medium upon which a program is recorded, and which is used in order to install, execute, and distribute the program, for example.

The recording medium may be a Digital Versatile Disc (DVD), encompassing formats such as DVD-R, DVD-RW, and DVD-RAM defined by the DVD Forum and formats such as DVD+R and DVD+RW defined by DVD+RW Alliance, a compact disc (CD), encompassing formats such as read-only memory (CD-ROM), CD Recordable (CD-R), and CD Rewritable (CD-RW), a Blu-ray Disc (registered trademark), a magneto-optical (MO) disc, a flexible disk (FD), magnetic tape, a hard disk, read-only memory (ROM), electrically erasable and programmable read-only memory (EEPROM (registered trademark)), flash memory, random access memory (RAM), or a Secure Digital (SD) memory card, for example.

In addition, all or part of the above program may also be recorded to the recording medium and saved or distributed, for example. Also, all or part of the above program may be communicated by being transmitted using a transmission medium such as a wired or wireless communication network used in a local area network (LAN), a metropolitan area network (MAN), a wide area network (WAN), the Internet, an intranet, an extranet, or some combination thereof, or alternatively, by being modulated onto a carrier wave and propagated.

Furthermore, the above program may be part or all of another program, or be recorded to a recording medium together with other separate programs. The above program may also be recorded in a split manner across multiple recording media. The above program may also be recorded in a compressed, encrypted, or any other recoverable form.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
an association unit that associates a first document image with a second document image, the second document image being an image of a reverse side of the first document image;
a generation unit that generates a plurality of patterns of images in accordance with a result of the association,
wherein each of the patterns includes: (i) both the first document image and the second document image; and (ii) a different positional arrangement of the first document image with respect to the second document image;
an output unit that outputs the plurality of patterns of images generated by the generation unit;
a reception unit that receives a selection of a pattern selected from the plurality of patterns output by the output unit, the selection being made by a user operation; and
a print unit that prints the selected pattern.

2. The image processing device according to claim 1, wherein
the output unit prints a reduced image of the plurality of patterns of images generated by the generation unit.

3. The image processing device according to claim 1, wherein
the output unit causes a display to display a reduced image of the plurality of patterns of images generated by the generation unit.

4. The image processing device according to claim 1, wherein
the output unit outputs the plurality of patterns of images generated by the generation unit, and a plurality of codes used to select the plurality of patterns of images,
the reception unit receives a code selected by a user operation, and
the print unit, in accordance with the code received by the reception unit, prints one or more patterns of images corresponding to the received code.

5. The image processing device according to claim 1, wherein
the generation unit generates a pattern for a case of printing onto a single sheet, and pattern for a case of printing onto a plurality of sheets.

6. The image processing device according to claim 1, wherein
the reception unit receives a selection made previously by a user operation as a current selection.

7. The image processing device according to claim 6, wherein
the reception unit prompts a user to select a print pattern if document images different in number from previously selected document images are extracted from a read-in image.

8. The image processing device according to claim 6, wherein
the reception unit prompts a user to select a print pattern if a predetermined amount of time has elapsed since a previous printing.

9. An image processing method comprising:
associating a first document image with a second document image, the second document image being an image of a reverse side of the first document image;
generating a plurality of patterns of images in accordance with a result of the associating,
wherein each of the patterns includes: (i) both the first document image and the second document image; and (ii) a different positional arrangement of the first document image with respect to the second document image;
outputting the plurality of patterns of images generated by the generating;
receiving a selection of a pattern selected from the plurality of patterns output by the outputting, the selection being made by a user operation; and
printing the selected pattern.

10. A non-transitory computer readable medium storing a program causing a computer to execute a process for processing images, the process comprising:
associating a first document image with a second document image, the second document image being an image of a reverse side of the first document image;
generating a plurality of patterns of images in accordance with a result of the associating,
wherein each of the patterns includes: (i) both the first document image and the second document image; and (ii) a different positional arrangement of the first document image with respect to the second document image;
outputting the plurality of patterns of images generated by the generating;

receiving a selection of a pattern selected from the plurality of patterns output by the outputting, the selection being made by a user operation; and printing the selected pattern.

\* \* \* \* \*